United States Patent [19]

Correll, Jr. et al.

[11] Patent Number: 5,095,609
[45] Date of Patent: Mar. 17, 1992

[54] WORK PIECE ASSEMBLY MACHINE

[75] Inventors: Robert S. Correll, Jr., Harrisburg; David D. Wiltraut, Hershey, both of Pa.

[73] Assignee: AMP, Incorporated, Harrisburg, Pa.

[21] Appl. No.: 502,159

[22] Filed: Mar. 29, 1990

[51] Int. Cl.$^5$ .................... H01R 43/00; B23P 21/00
[52] U.S. Cl. .................... 29/564.2; 29/761
[58] Field of Search .............. 29/564.1, 564.2, 564.4, 29/564.6, 564.7, 564.8, 747, 753, 754, 33 K, 33 M

[56] References Cited

U.S. PATENT DOCUMENTS

| | | | |
|---|---|---|---|
| 3,009,130 | 11/1961 | Redslob et al. | 339/176 |
| 3,709,023 | 1/1973 | Thode | 72/402 |
| 4,114,253 | 9/1978 | Loomis | 29/566.2 |
| 4,271,581 | 6/1981 | Eitzinger | 29/564.6 |
| 4,452,103 | 6/1984 | Lijewski | 74/817 |
| 4,523,378 | 6/1985 | Evans | 29/759 X |
| 4,531,280 | 6/1985 | Bakermans | 29/564.6 |
| 4,551,901 | 11/1985 | Bonifanti et al. | 29/564.6 |
| 4,554,725 | 11/1985 | Over et al. | 29/564.4 |
| 4,607,517 | 8/1986 | Finzer et al. | 72/449 |
| 4,612,700 | 9/1986 | Loomis et al. | 29/564.6 |
| 4,672,735 | 6/1987 | Tamano et al. | 29/739 X |
| 4,811,633 | 3/1989 | Bueschez et al. | 29/566.1 |

FOREIGN PATENT DOCUMENTS 8910  3/1980  European Pat. Off. ............. 29/753

*Primary Examiner*—William Briggs
*Attorney, Agent, or Firm*—David L. Smith

[57] ABSTRACT

A machine for assembling components in the form of ferrules (22) to electrical terminals (10) arranged in side-by-side strip form, comprises a rotary disc cam (50) with respective cam tracks (78 to 86) in which cam followers are connected to a feed member (26) for advancing the strip terminals (10), a shuttle (30) for presenting the ferrules (22) to an assembly station (AS) of the machine, an inserter (32) for taking each ferrule (22) from the shuttle (30) and assembling it to a respective terminal (10), a crimper (34) for crimping the ferrule (22) to the terminal (10) and a back-up device (36) for supporting the terminal (10) during the crimping operation. During each half revolution of the disc cam (50), the shuttle presents a ferrule (22) to the assembly station (AS) the inserter (32) inserts it over the terminal (10') at the assembly station (AS) and the crimper (34) and the backup device (36) cooperate to crimp the ferrule (22) to the terminal (10).

18 Claims, 14 Drawing Sheets of a strip of electrical terminals connected together in side by side spaced relationship by means of a carrier strip. Ferrules are commonly used for providing a closed seam entry in a stamped and formed metal socket body.

WORK PIECE ASSEMBLY MACHINE

FIELD OF THE INVENTION

This invention relates to a machine for assembling first work pieces to a strip-form second work piece and particularly concerns a machine for assembling components, for example ferrules to electrical connectors connected together in side by side spaced relationship by means of a carrier strip. Ferrules are commonly used for providing a closed seam entry in a stamped and formed metal socket body.

BACKGROUND OF THE INVENTION

Electrical terminals to which components, such as the ferrules mentioned above, have been assembled, are described in U.S. Pat. No. 3,009,130, which is hereby incorporated herein by reference. There is described in U.S. Pat. No. 4,551,901 and U.S. Pat. No. 4,612,700 a machine for staking electrical pins to a printed circuit board, comprising a two-sided disc cam driven by an electrical motor and having, on either side, cam tracks extending about the axis of rotation of the disc cam and being connected to mechanisms for advancing and retracting a pin inserter, for opening and closing a pair of shear blades, and for opening and closing jaws of the pin inserter. A barrel cam rotatable about the same axis as the disc cam has a cam follower connected to mechanism for operating a feed finger for the purpose of advancing the pins, which are arranged in strip form, towards the inserter and the shear blades. A pin is staked to the board during each full revolution of said cams. U.S. Pat. No. 4,452,103 discloses the use of primary and secondary rotatable barrel cams on a common shaft, for driving a rotary work table. U.S. Pat. No. 4,607,517 relates to a stamping and bending tool assembly in which tooling extending about a central working area is operated by means of a driving ring gear concentric with the work area. There is described in U.S. Pat. No. 3,709,023, a bending or punching machine for the production of shaped parts from wire or strip by means of tools grouped around a central work place, and connected to sliding carriages which are movable towards and away from the work place.

SUMMARY OF THE INVENTION

The present invention provides a machine for assembling first work pieces, for example, ferrules, to a strip-form second work piece, for example, a strip of electrical terminals, the machine comprising assembly tooling operated by a single disc cam, and in which a plurality of first work pieces are assembled to the second work piece, during each revolution of each disc cam.

The disc cam has a series of cam tracks extending thereabout, means, for example, an electrical motor, being provided for driving the disc cam in continuous rotation about its own axis. Feed means for the second work piece, assembly means for the first work pieces and a shuttle for presenting a work piece at a time to the assembly means, are connected through respective operating mechanisms to cam followers in respective cam tracks of the disc cam. The feed means for the second work piece feed it along a work piece feed path, by one step during each half revolution of the disc cam, the feed path extending axially thereof. The work piece assembly means, which may be in the form of a work piece inserter, is driven in reciprocating movement transversely of the feed path and towards and away from the shuttle, to assemble a first work piece to the second work piece during each half revolution of the disc cam. Further cam followers in respective further cam tracks of the disc cam may be connected to tooling, for example crimping tooling, for securing each first work piece to the second work piece, said tooling serving, for example, to crimp a ferrule or some other component, for example a sleeve, to an electrical terminal of the second work piece. Each such securing operation is carried out during a half revolution of the disc cam. The shuttle may be provided with two receptacles spaced from one another longitudinally thereof, each for receiving a first work piece, for example from a vibratory bowl feed device for feeding a first work piece into one receptacle, in one end position of the shuttle, and into the other receptacle at an opposite end position of the shuttle. The securing tooling may, for example, comprise a crimping first tool, and a pilot and back-up tool having a pilot pin for engaging in indexing holes in the second work piece to position it relative to the crimping tooling. The work piece feed means for the second work piece may comprise a feed member having at least one feed finger for engaging in said pilot holes, means being provided for moving the feed member through a forward horizontal stroke to advance the second work piece, with the feed finger in a respective pilot hole; vertically moving the feed member to withdraw the feed finger from the hole; moving said finger through a retractile horizontal stroke; and then moving vertically to insert the pin in a further index hole in the second work piece.

The disc cam may be enclosed within, and mounted for rotation in, a hollow frame, on the exterior of which are mounted said work piece feed and assembly means and the shuttle, the disc cam having peripheral teeth which are engaged by a gear wheel driven by an electric motor mounted beside the frame.

BRIEF DESCRIPTION OF THE DRAWING

FIG. 10 is a view similar to that of FIG. 9, but showing the opposite side of the disc cam;

DESCRIPTION OF THE PREFERRED EMBODIMENT

Figure 1:
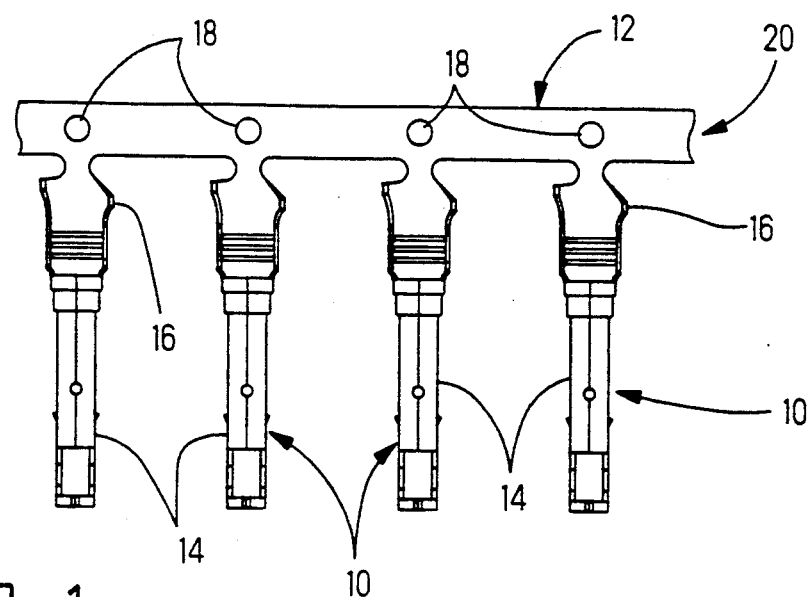
FIG. 1 is a plan view of a section of a strip of electrical terminals.
Figure 2:
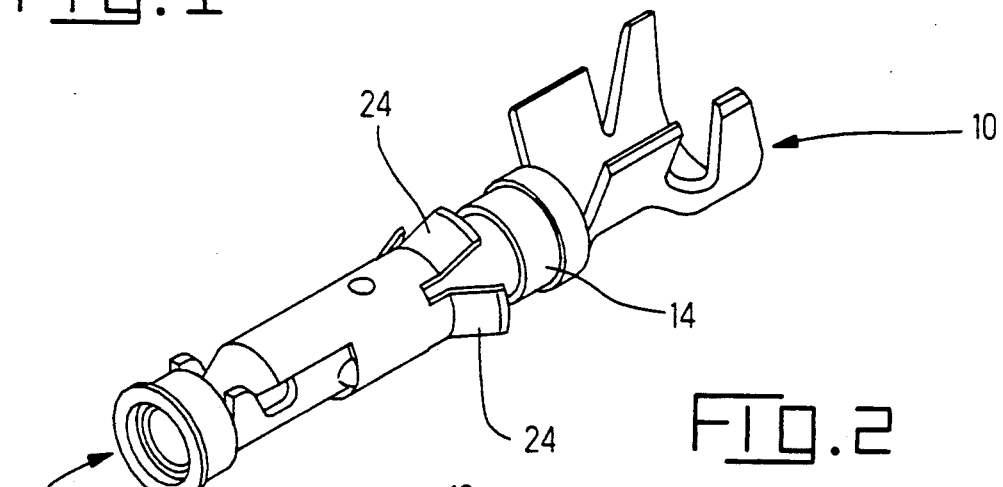
FIG. 2 is an isometric, exploded view, drawn to a larger scale than FIG. 1, and showing part of a terminal of the strip shown therein and a ferrule for assembly thereto.
Figure 3:
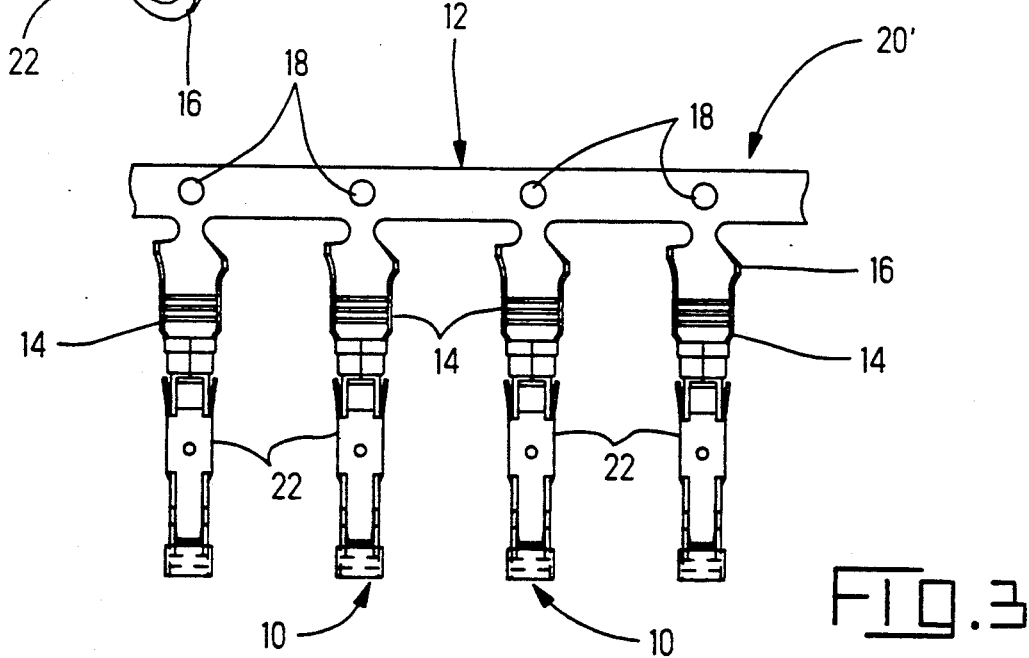
FIG. 3 is a similar view to that of FIG. 1 but showing the terminals of the strip shown therein, each with a ferrule assembled thereto.

As shown in FIG. 1, electrical terminals 10 connected together in side by side spaced relationship by means of a carrier strip 12 each comprise an elongate mating portion 14 in the form of a barrel and a crimping ferrule 16 attached to the carrier strip 12 which is formed with a pilot hole 18 opposite to each terminal 10. The strip of terminals 10 is generally referenced 20. The machine, which is described below, is for assembling a ferrule 22, which is best seen in FIG. 2, to the mating portion 14 of each terminal 10 and for securing it thereto by means of a crimping operation. Each terminal 10 has spring tongues 24 for latching engagement in a cavity in an insulated housing to latch the terminal 10 therein when the terminal has been severed from the strip 12 and has been stitched into the cavity. FIG. 3 shows a terminal strip, which is referenced 20' therein, with a ferrule 22 assembled to, and secured to, each terminal 10, the strip 20' being the product of the machine described below.

Figure 4:
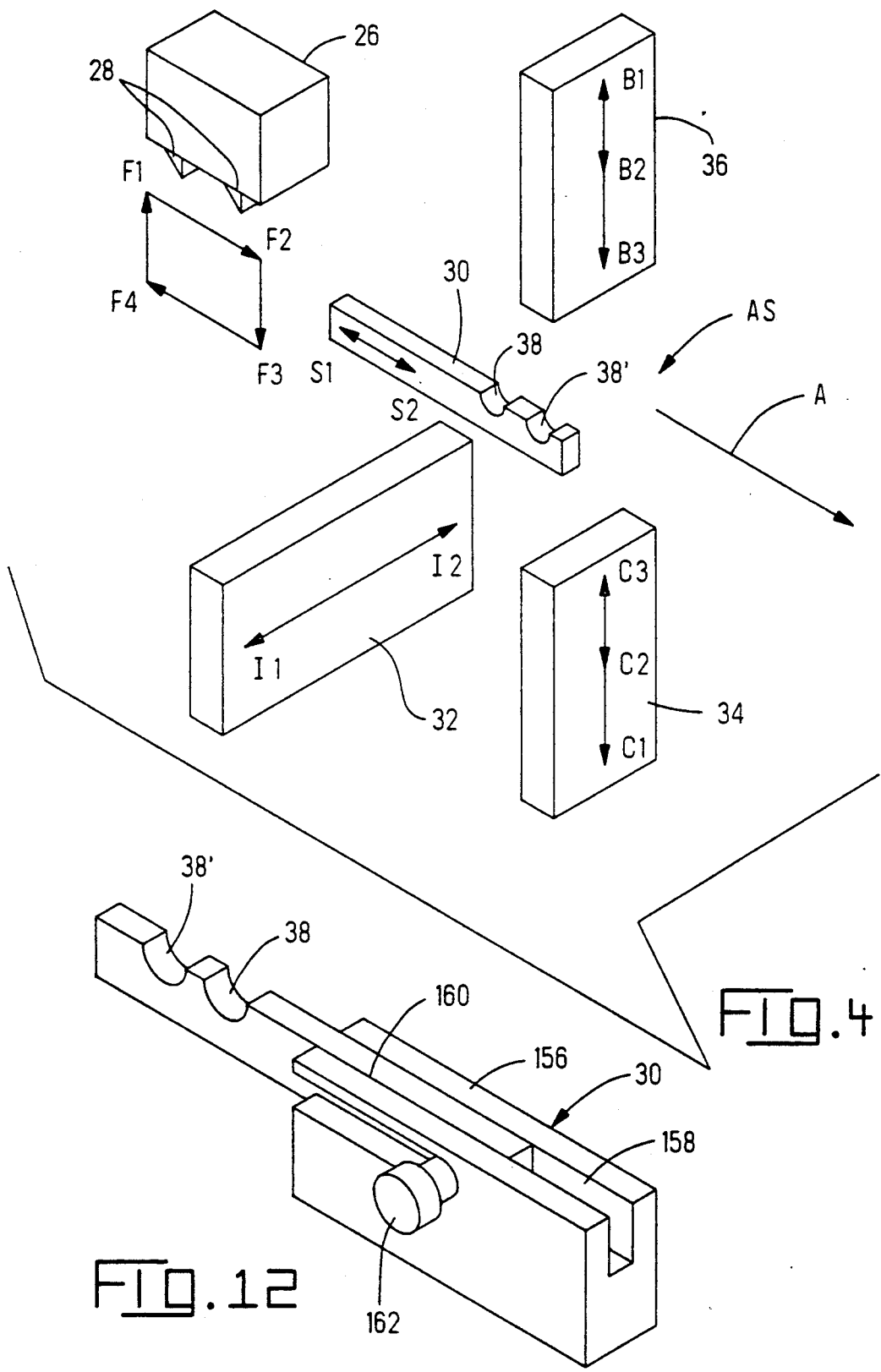
FIG. 4 is a block diagram illustrating, in basic form, the operation of a machine for applying the ferrules to the terminals.

The machine and its operation will be now described, briefly and in outline, with reference to FIG. 4. The machine comprises basically, a terminal strip feed member 26 from which depend a pair of feed fingers 28, a component feed shuttle 30, for the ferrules 22, assembly means in the form of a ferrule inserter 32 and ferrule securing means in the from of a crimper 34 and a back-up member 36. The feed member 26 is arranged to feed the strip 20, with the portions 14 of the terminals 10 directed towards the shuttle 30, along a feed path in a direction indicated by the arrow A in FIG. 4. The shuttle 30 is moveable in the feed direction indicated by the arrow A, between two end positions S1 and S2, the inserter 32 being moveable towards and away from the shuttle 30, at right angles to the feed direction, between end positions I1 and I2, the crimper 34 and the back-up member 36 being moveable towards and away from one another between end positions C1 and C3 and B1 and B3, respectively, at right angles to the feed direction indicated by the arrow A. The feed member 26 is moveable horizontally between end positions F1 and F2 and F3 and F4 and is moveable vertically between positions F2 and F3 and F4 and F1 as indicated by arrows. A cycle of the machine will now be described. Initially, the back up member 36 is at its retracted position B1, the crimper 34 being in its retracted position C1, the inserter 32 being in its retracted position I1, the shuttle 30 being in its retracted position at S1 and the feed member 26 being at a lowered and a retracted position F4 with the feed fingers 28 engaging each in a respective pilot hole 18 of the carrier strip 12. As will be described in detail below, all of the machine parts referred to above, are driven by means of a common, rotary disc cam. With the machine parts positioned as described above, at the beginning of a revolution of the disc cam, the parts are moved thereby as follows. The feed member 26 is moved from F4 to F3 so as to advance the strip 20 a distance corresponding to the pitch of the terminals 10. As the feed member 26 begins to advance, the crimper 34 and the back-up member 36 begin to move forward to positions C2 and B2, respectively, the shuttle 30 into an end receptacle 38' of which a ferrule 20 was fed during a previous cycle of operation being stationary at position S1. The feed member 26 is raised to position F1. Before the crimper 34 and backup member 36 are fully seated (at positions C3 and B3, respectively) against the leading terminal 10 of the strip 20, the inserter 32 is advanced from position I1 to I2 and inserts the ferrule 22 in the receptacle 38' over the leading terminal 10 at assembly station AS. Crimper 34 and the back-up member 36 then complete their movements to C3 and B3, respectively, to crimp the ferrule 22 to the terminal 10 and thus to secure it thereto. During this time, the feed member 26 has been retracted in its raised position, to position F1. The inserter 32, the crimper 34, the back-up member 36 are then retracted to positions I1, C1 and B1, respectively, the feed member 26 is lowered to position F4 the shuttle 30 is advanced to position S2 to locate the trailing receptacle 38 of the shuttle 30 at the assembly station AS at which the insertion and crimping operations described above occurred. The disc cam has then completed a half revolution. During the next half revolution of the disc cam, the machine parts described above, are moved through their working strokes in the manner described above, excepting that the ferrule 22 in the trailing receptacle 38 is assembled to the next following terminal 10 and the shuttle 30 is retracted to position S1 instead of being advanced to position S2. During each revolution of the disc cam, the assembly of a ferrule 22 to each of two terminals 10, is completed.

Figure 5:
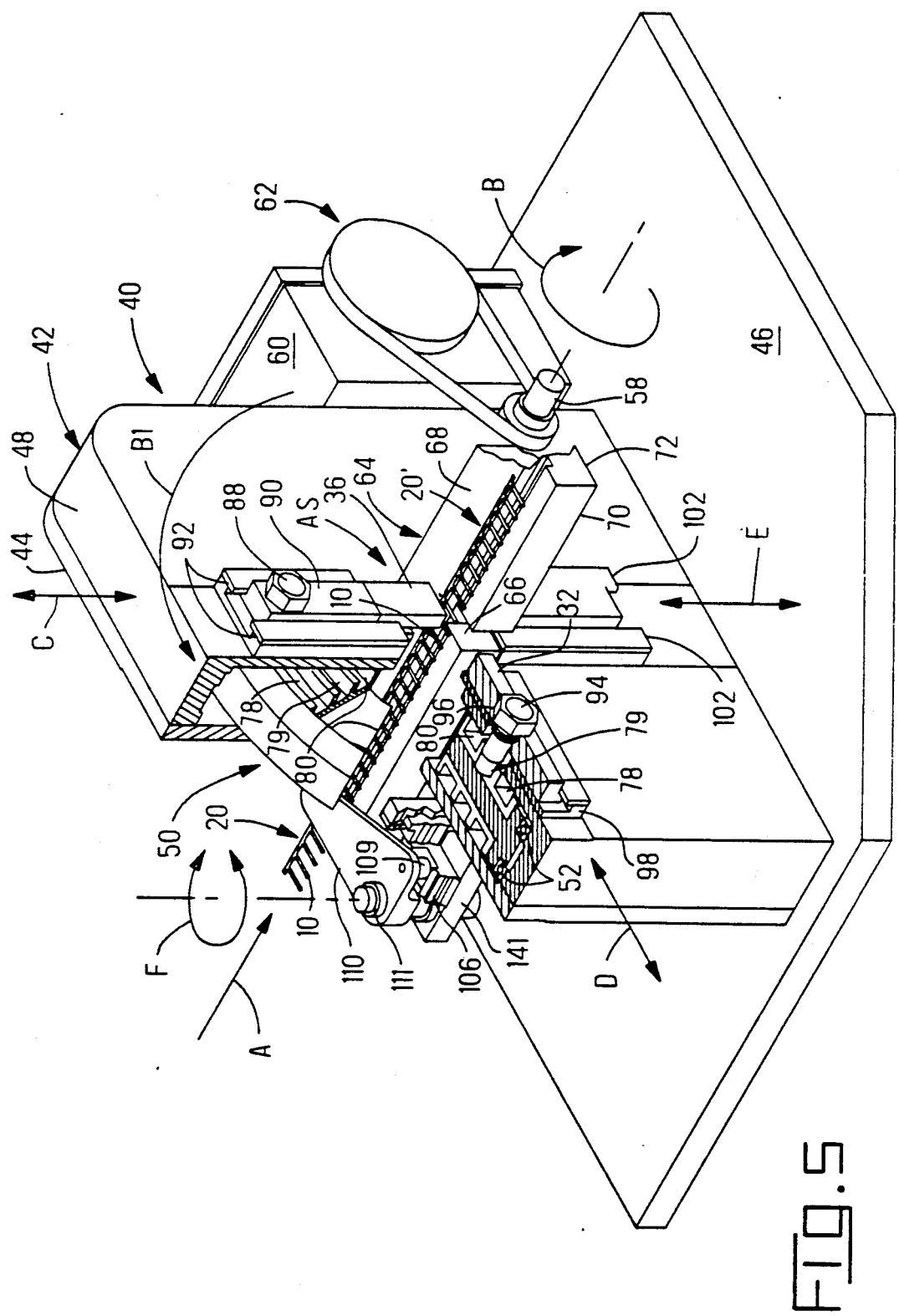
FIG. 5 is an isometric view of the machine, with parts omitted.
Figure 6:
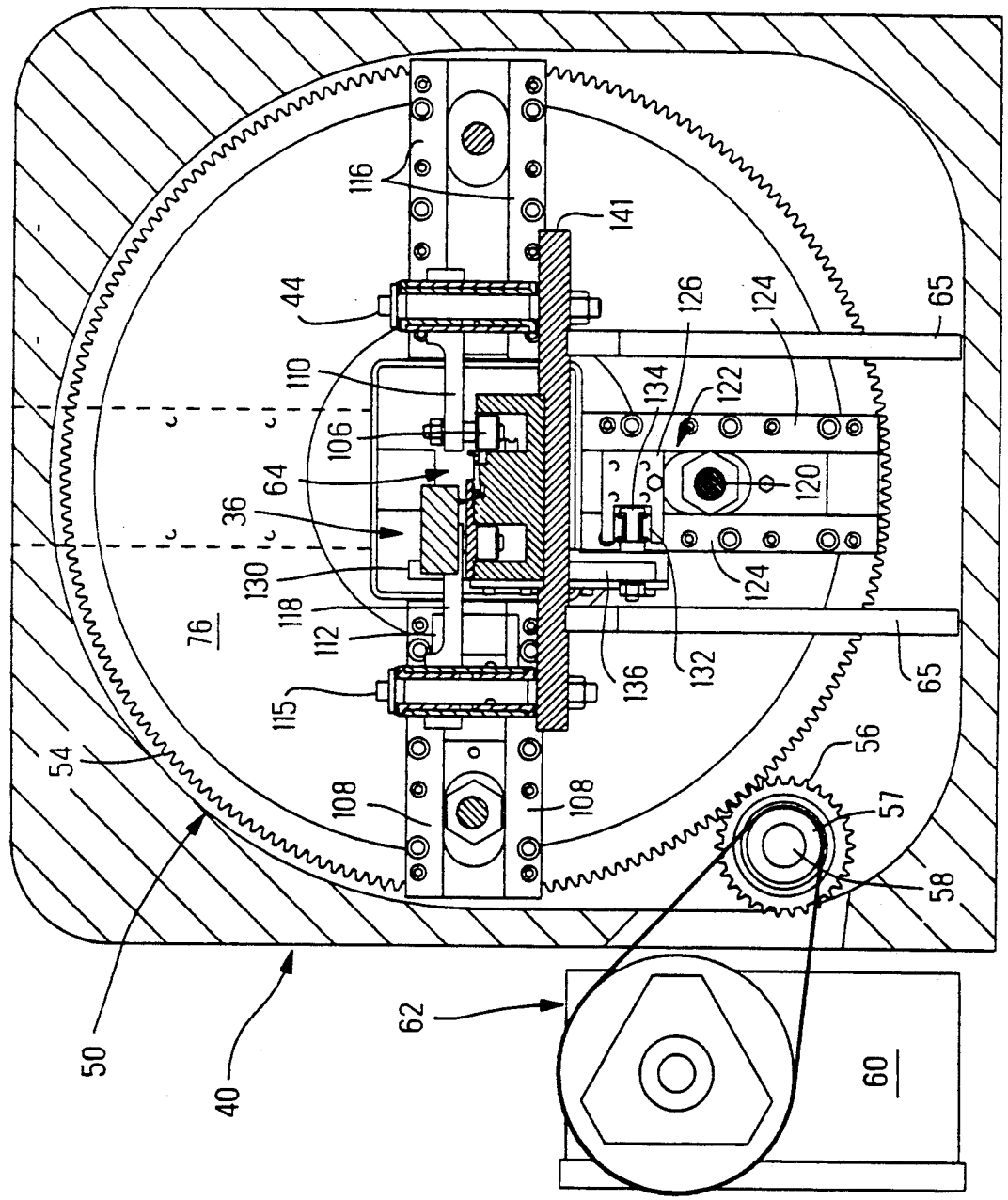
FIG. 6 is a partly diagrammatic side view of the machine, shown partly in section, and taken through a frame thereof.
Figure 7:
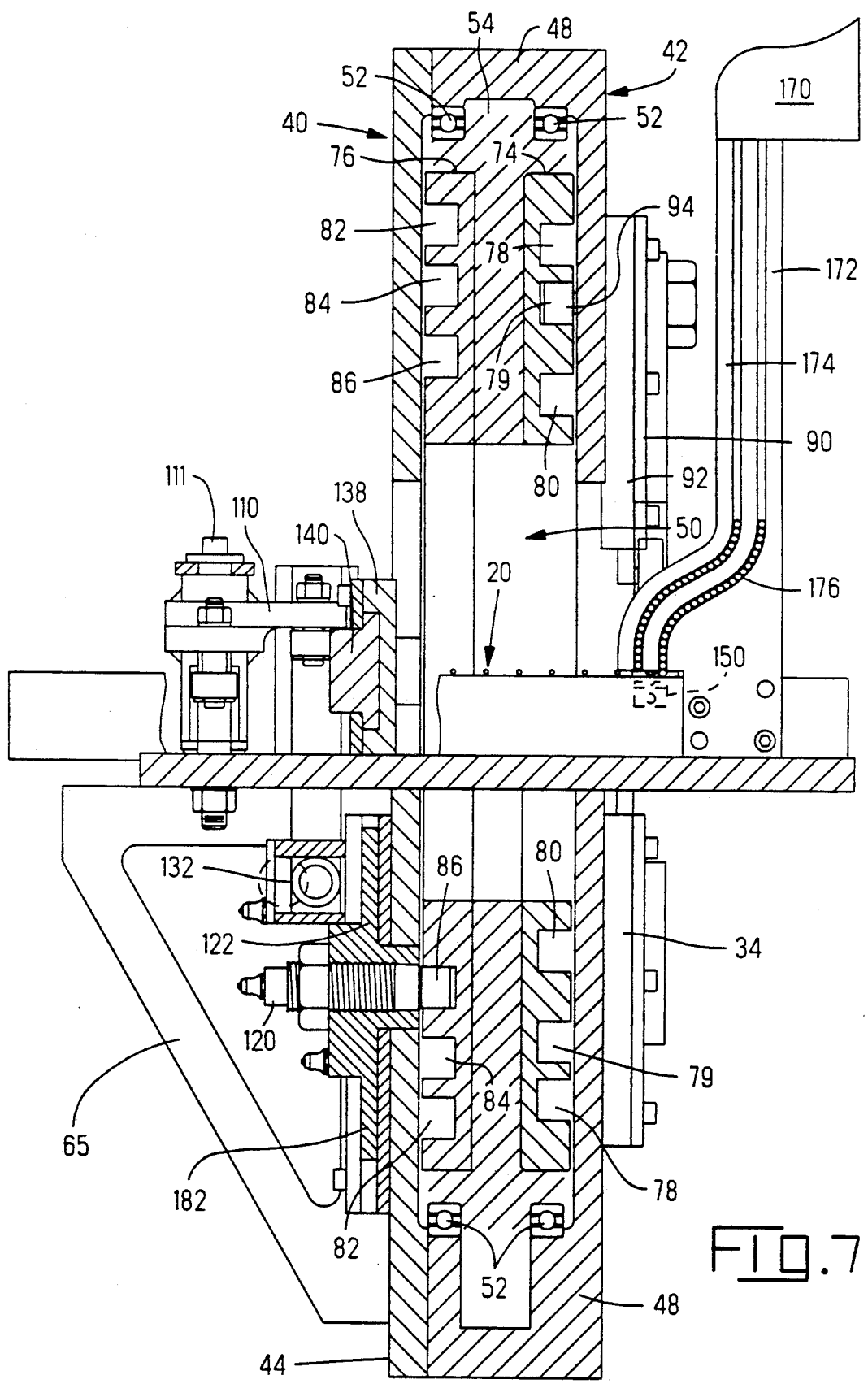
FIG. 7 is a partly diagrammatic axial sectional view of the machine.

As shown in FIGS. 5 to 8, the machine comprises a frame 40 provided by juxtaposed frame plates 42 and 44, supported on a work table 46. The plate 42 which comprises a peripheral flange 48 projecting normally therefrom, cooperates with the plate 44 to enclose the disc cam mentioned above, which is generally referenced 50. As best seen in FIG. 7, the disc cam 50 is rotably mounted to the flange 48, is thus rotably mounted in the frame 40, by means of parallel ball bearings 52, between which the disc cam 50 is provided with peripheral teeth 54, which mesh as shown in FIG. 6, with the teeth 56 of a spur gear 57 on a shaft 58 journaled in the side plates 42 and 44 and being connected with a drive electrical motor in a motor housing 60 mounted on the work table 46 beside the frame 40, by means of a belt drive assembly 62. Motor 60 is arranged to drive the disc cam 50 in continuous rotation, at an even angular speed in the bearings 52. A feed track 64 for the strip 20, 20' supported in the plates 42 and 44 and extending at right angles to the axis of rotation of the disc cam 50 through a central opening 67 therein is provided with a tooling access notch 66 at the assembly station AS, extending beneath the leading terminal 10 of the strip 20 and opening into the upper, strip supporting surface 68 of the track 64, into its leftward (as seen in FIG. 5) surface 70 and into its lower surface 72. As shown in FIG. 7, the disc cam 50 has recessed therein, a cam plate 74 on its right hand, inserter side, and an opposed, aligned cam plate 76 on its lefthand (as seen in FIG. 7), feed side. The plate 74 is formed with three cam tracks 78, 79 and 80, the cam plate 76 being formed with three cam tracks 82, 84 and 86 respectively. Each cam track is endless and extends about the axis of rotation of the disc cam 50. The configuration of the cam tracks 78 to 80 and 82, 84 and 86 is shown in FIG. 9 and 10. A cam follower 88 in the cam track 78 is connected via a slot in the plate 42 to a pilot and hold down slide 90, slideably mounted in gibs 92 on the frame plate 42 for vertical reciprocating movement (arrow C in FIG. 5) at right angles to the axis of rotation of the disc cam 50 as the latter is rotated in a counter clockwise sense by the motor which will be apparent from the arrows B and B1 in FIG. 5. The slide 90 carries at its radially inner end, the backup member 36 which acts as terminal hold down and pilot member as described below. In the cam track 79 is a cam follower 94 which extends through the slot 96 (FIG. 5) in the side plate 42 and is connected to the inserter 32 which is slideable in a slideway 98 for reciprocating movement towards and away from the assembly station AS and at right angles to the feed track 64 and thus radially of the disc cam 50, as it is rotated. In the cam track 80, is a cam follower 100 which is connected to the crimper 34 which is slideable in the gibs 102 radially of the disc cam 50 towards and away from the assembly station AS as indicated by the arrow E in FIG. 5, as the disc cam 50 is rotated.

Figure 8:
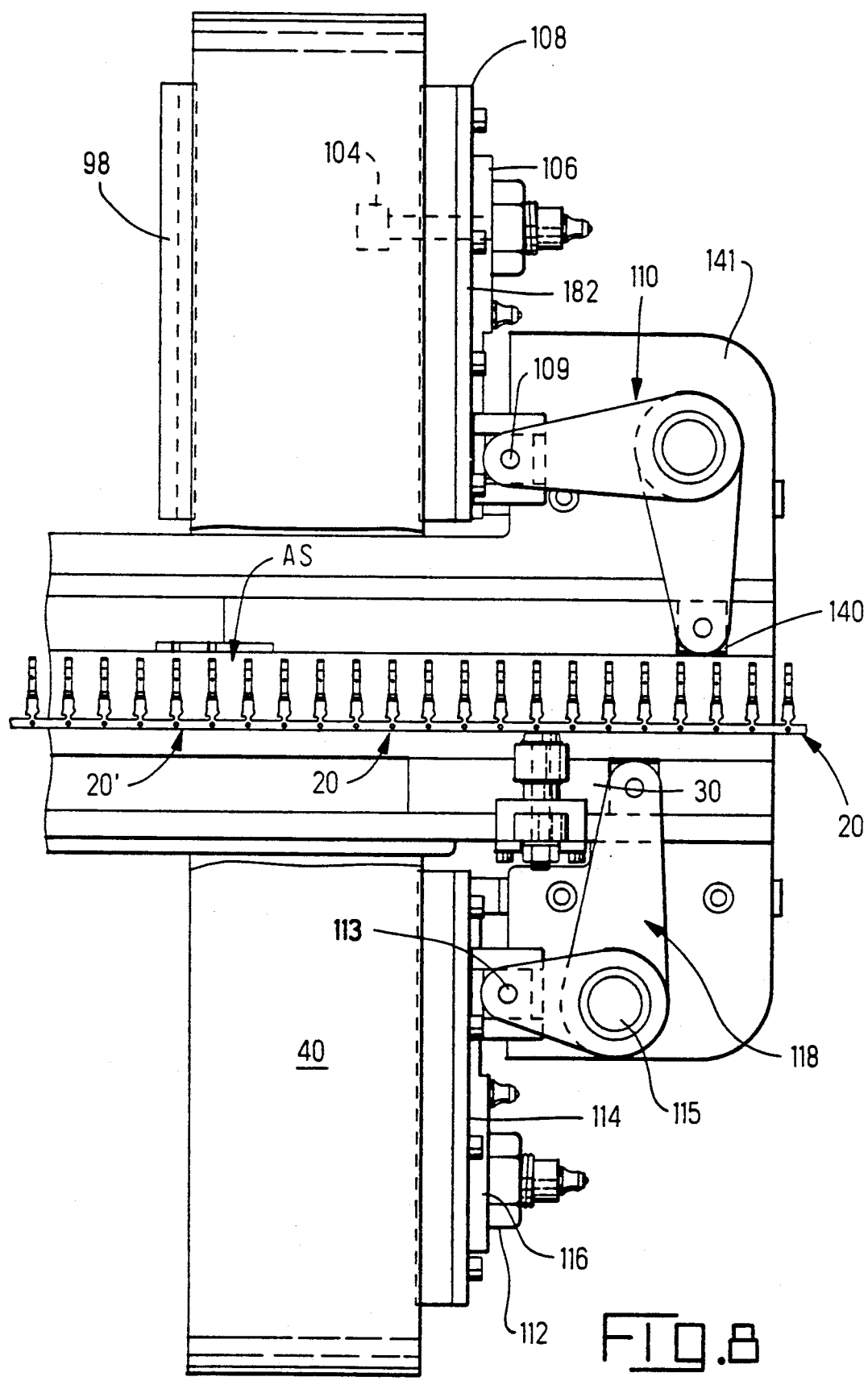
FIG. 8 is a partly diagrammatic fragmentary plan view of the machine, shown partly in section.
Figure 9:
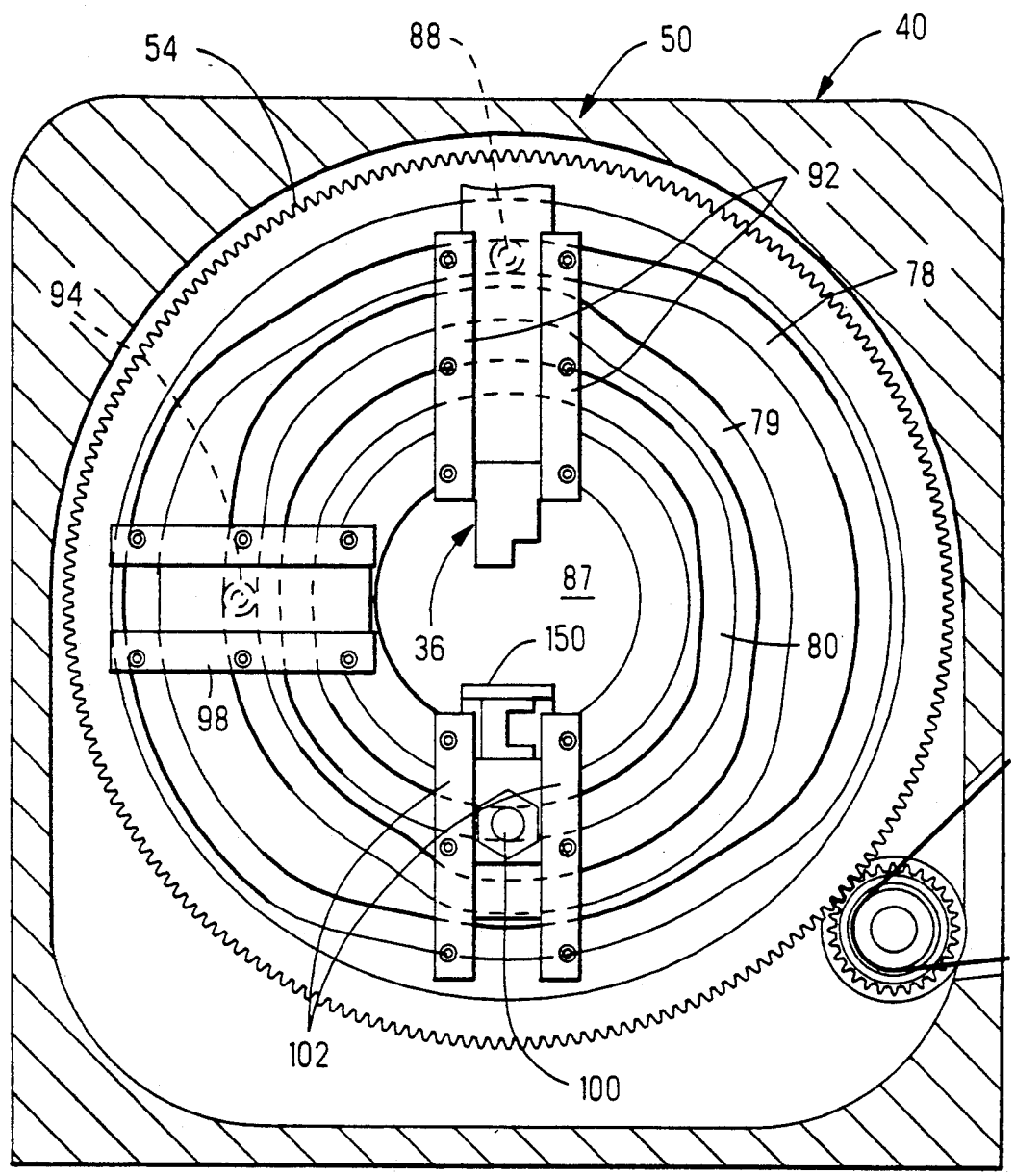
FIG. 9 is a view, taken through said frame, showing one side of a rotary disc cam of the machine.
Figure 11:
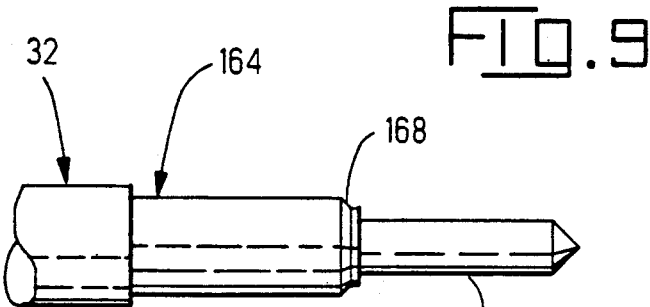
FIG. 11 is a side view of a ferrule insertion tool of the machine.
Figure 17:
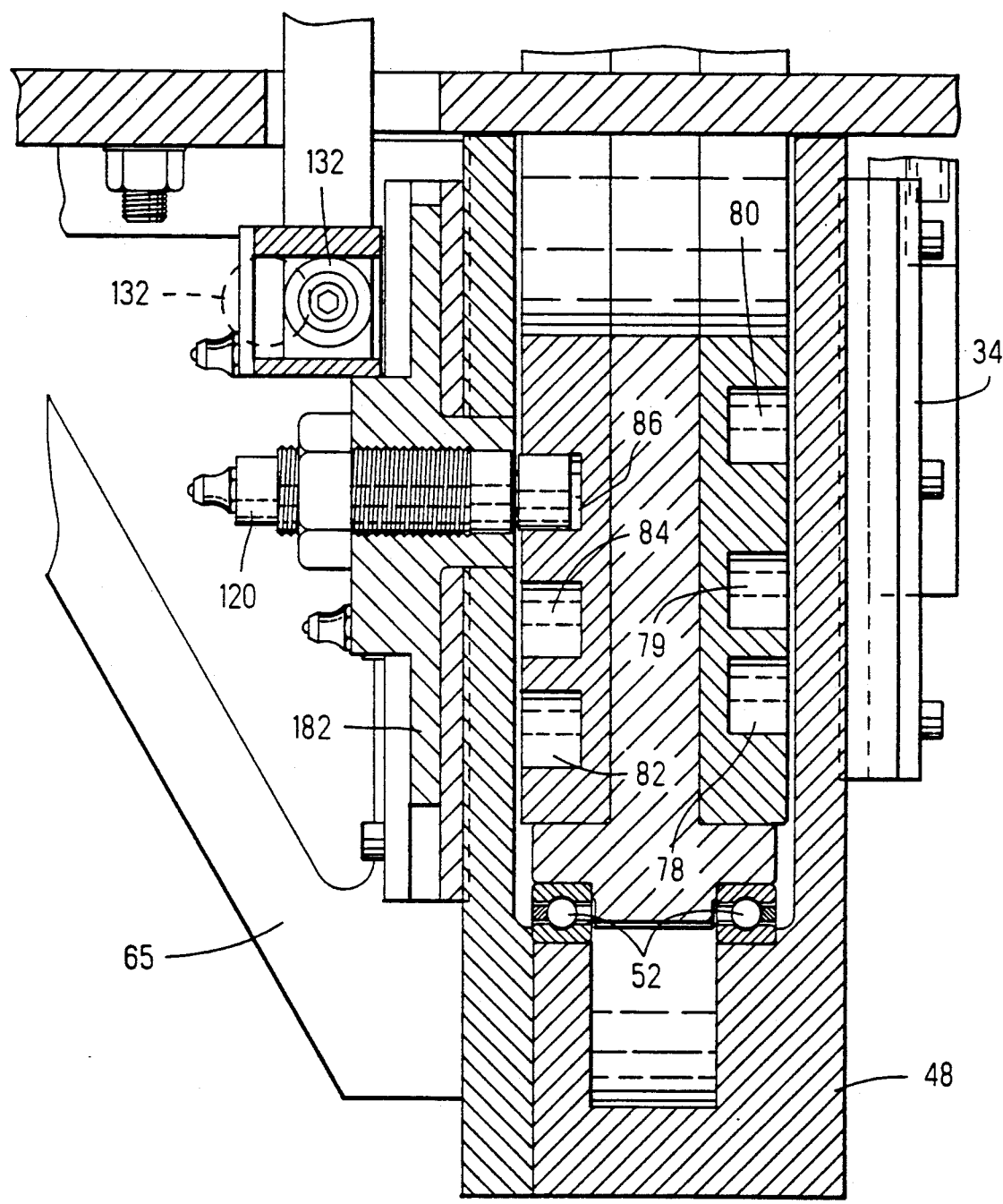
FIG. 17 is an enlarged, fragmentary, cross sectional view of the machine illustrating details of the disc cam and of a cam follower assembly thereof.

In the cam track 82 of the cam plate 76 is a cam follower 104, which as shown in FIGS. 8 and 11, is connected to a feed slide 106 which is slideable in gibs 108 on the side plate 44, radially of the disc cam 50 and which is connected by way of a spigot 109, to a rocker 110, in the form of a bell crank pivoted about a pin 111, as indicated by the arrow F, for driving the shuttle escapement member 30 which is moved between its two end positions during each revolution of the disc cam 50. A cam follower 112 in the cam track 84 is connected to a slide 114 which is slideable in gibs 116 radially of the disc cam 50, slide 114 being connected by way of a spigot 113 to a rocker 118 in the form of a bell crank which is pivotable about a pin 115 and which is connected to the feed member 26 in horizontal reciprocating movement as the disc cam 50 is rotated. A cam follower 120 in the cam track 86 is connected to a slide 122, as best seen in FIG. 7, a lowered portion of which is slideable in gibs 124 on the plate 44 as best seen in FIGS. 6 and 7, radially of the disc cam. As will be apparent from FIGS. 6, 7, 16 and 17, the feed member 26 with its depending feed fingers 28, is mounted to the top of an upper portion 130 of the slide 122 which is coupled to said lower portion 126 thereof by way of a roller 132 which is moveable along a horizontal slot 134 in the slide portion 126, the slide portion 130 being vertically slideable in a slide holder 136 which is in turn received in a horizontal slide 138 which is horizontally moveable in a further slide holder 140, by the rocker arm 118. The two end positions of the roller 132 are shown in FIGS. 7 and 17. The rockers 110 and 118 are mounted on a platform 141 projecting from the side plate 44, and being supported by brackets 65 thereon.

Figure 14:
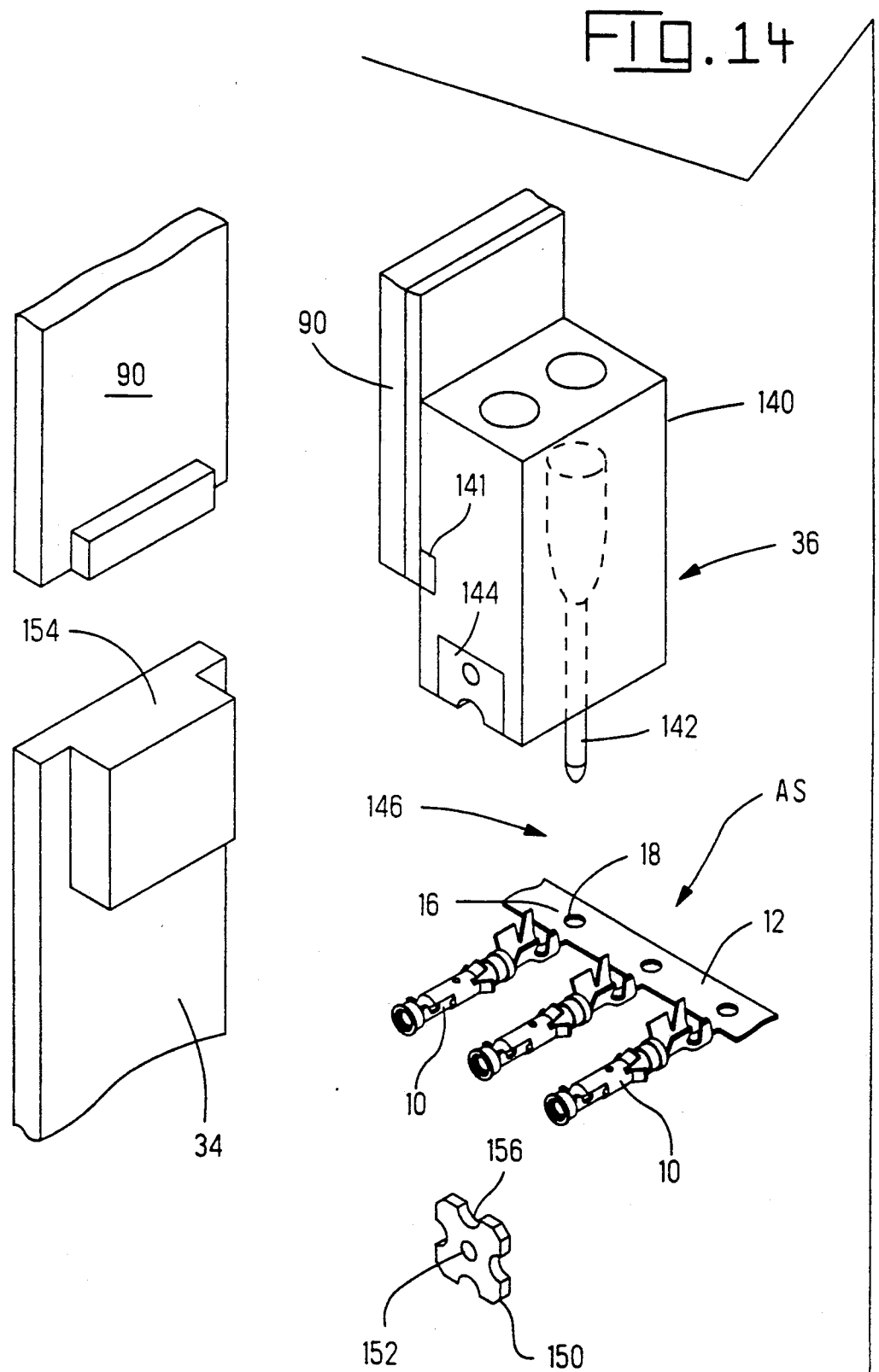
FIG. 14 is a diagrammatic, exploded, isometric view illustrating details of said assembly station.

The back-up member 36 comprises, as best seen in FIG. 14, a main block 140, secured to the slide 90 by means of a tongue and slot connection 141 and having slideably mounted therein a spring loaded pilot pin 142 for insertion through pilot hole 18 of the carrier strip 12 at the assembly station AS, the pin 142 projecting beneath the block 140. Also secured to the block 140 projecting therebeneath is a terminal hold down tool 144 having a semi-circular cross section recess 136 for engaging about the barrel portion 14 of the terminal 10 at the station AS.

The crimper 34 has mounted in its upper end, a four sided crimping tool 150 (FIG. 14) which is mounted for angular adjustment about its axis 152 in a slot 154 the upper surface of the crimper 34, to bring a desired crimping recess 156 thereof to a position to project upwardly from the slot 154 to crimp a ferrule 22 to the barrel 14 of the terminal 10 when held down against the upper surface of the crimper 34 by the hold down tool 144. In Figures other than FIG. 14, the tool 150 is shown only diagrammatically.

Figure 12:
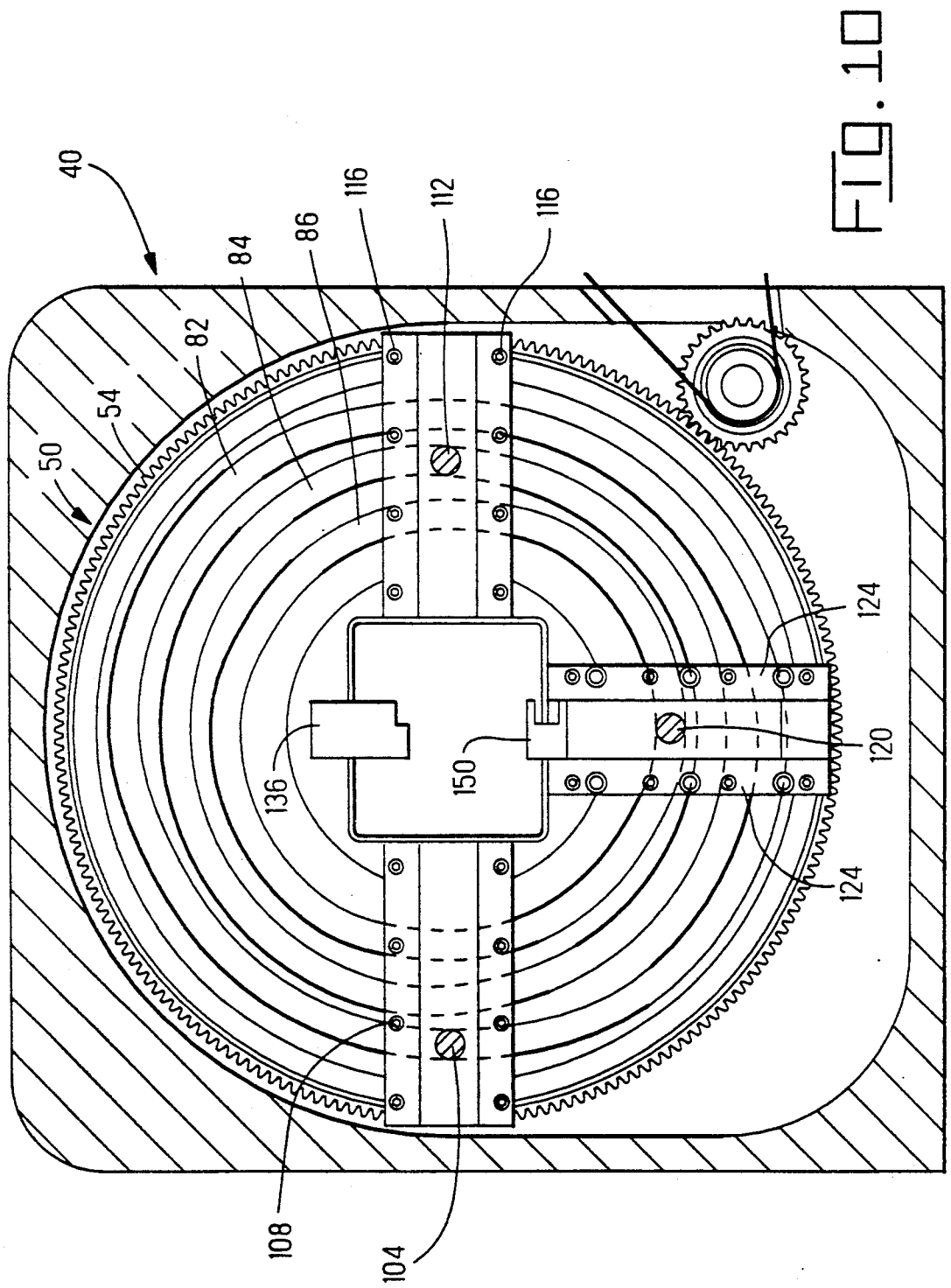
FIG. 12 is an isometric view of a shuttle assembly of the machine.

As shown in FIG. 12, the shuttle 30 comprises a slide body 156 which is mounted between the gibs 116 and which has a central longitudinal slot 158 slidably receiving a shuttle tool 160, the upper surface of which is formed with the receptacles 38 and 38', the shuttle tool 160 being longitudinally adjustable relative to the body 156 by means of an adjusting screw 162.

Figure 15:
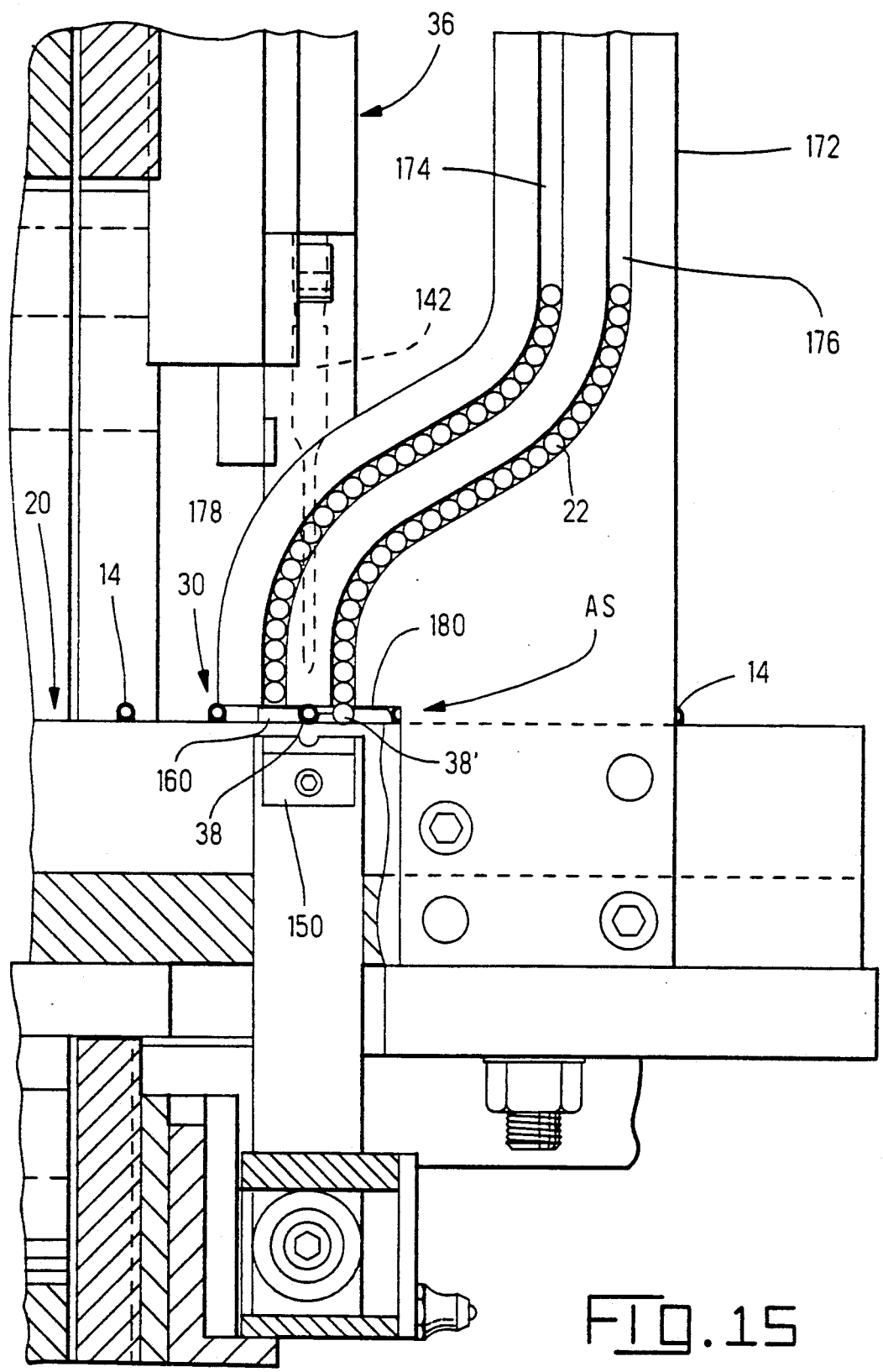
FIG. 15 is a diagrammatic, fragmentary front view of the assembly station, illustrating means for feeding ferrules to a shuttle tool of the shuttle assembly.
Figure 16:
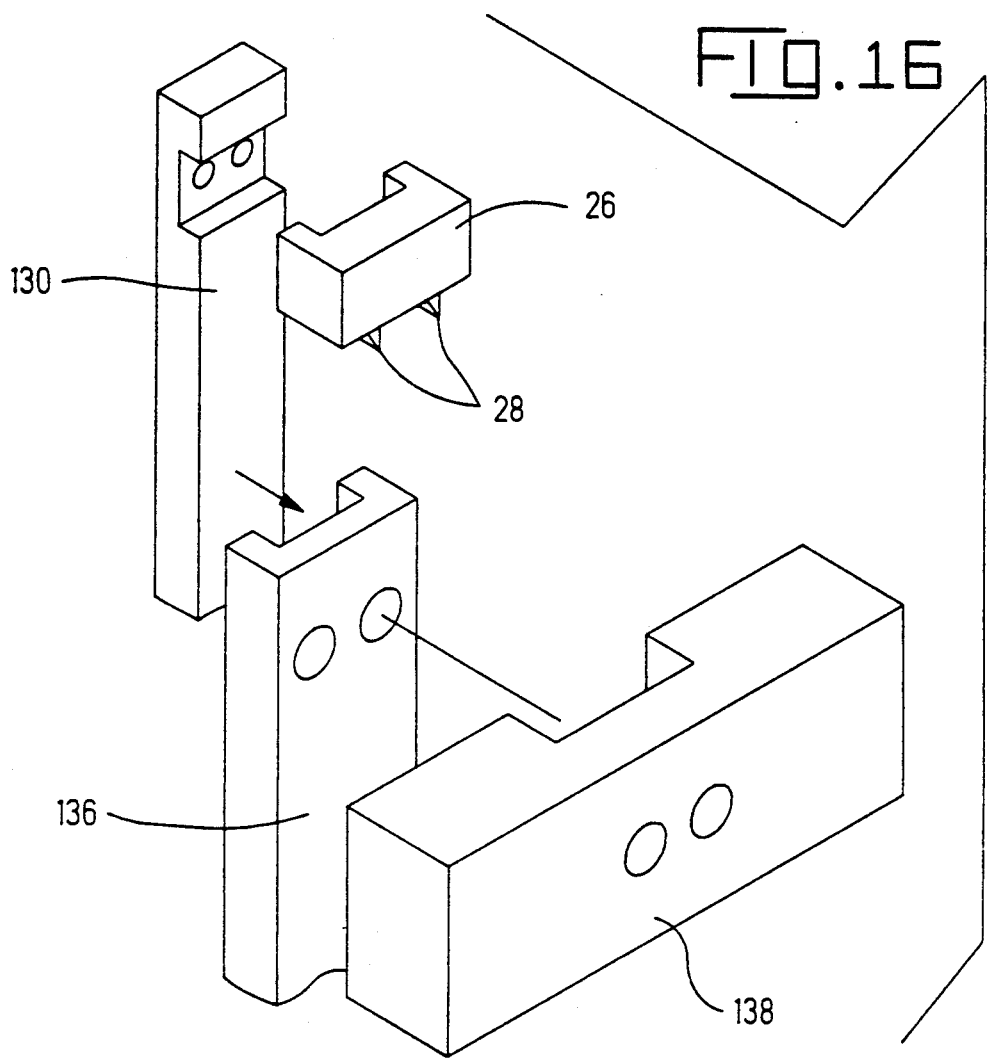
FIG. 16 is a diagrammatic, exploded, isometric view of part of a terminal strip feed assembly of the machine.

The inserter 32 carries at its end nearest to the assembly station AS, an insertion tool 164 which is shown in FIG. 11 and which has a reduced cross section free end portion 166 for receiving a ferrule 22 from the receptacle 38 or 38' of the shuttle tool 160, as the inserter 32 is advanced towards the assembly station AS, for insertion on the barrel portion 14 of the terminal 10 thereat so that the ferrule 22 is pushed onto the barrel 14 by means of an abutment shoulder 168 behind the reduced cross section portion 166. The shuttle tool 160 is fed with the ferrules 22 by means of vibratory feed bowl 170, shown diagrammatically in FIG. 7, and which contains a supply of the ferrules 22 in loose-piece form. The feed bowl 170 communicates with a ferrule feed track 172, which is best seen in FIG. 15 and which comprises two parallel feed conduits 174 and 176 leading to the assembly station AS and down which the ferrules 22 are fed by gravity. The shuttle tool 160 is slideable with the shuttle 30 with the upper surface of the tool 160 in which the receptacles 38 and 38' are formed, closely adjacent to feed openings 178 and 180, respectively, of the conduits 174 and 176, so that when the shuttle 30 is in its S1 position, the ferrule 22 is loaded into the receptacle 38 and when the shuttle 30 is in its S2 position a ferrule 22 is loaded into the receptacle 38'.

Figure 13:
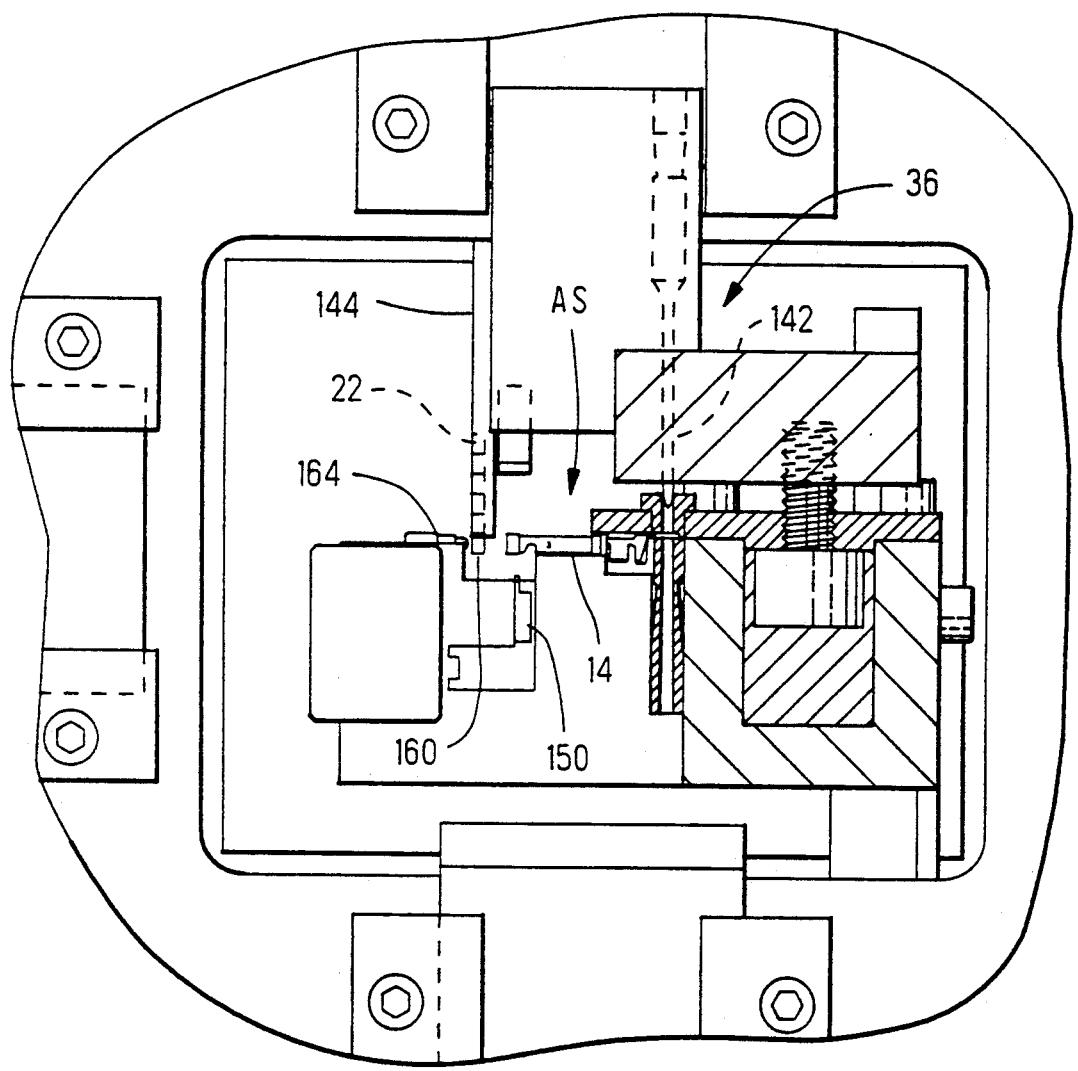
FIG. 13 is a diagrammatic fragmentary side view, shown partly in section, illustrating an assembly station of the machine.

FIG. 13 shows diagrammatically the hold down tool 144 about to descend on the barrel portion 14 of terminal 10 at the station AS, the pilot pin 142 engaged in the pilot hole 18 of the carrier strip 12 holds the terminal 10 at the station AS in position, the insertion tool 164 is about to pick up a ferrule 22 from the shuttle tool 160 and the crimping tool 150 is approaching the barrel portion 14. When the tool 164 has pushed the ferrule 22 onto the barrel portion 14, the hold down tool 144 cooperates with the crimping tool 160 to crimp the ferrule 22 to the barrel portion 14.

Figure 18:
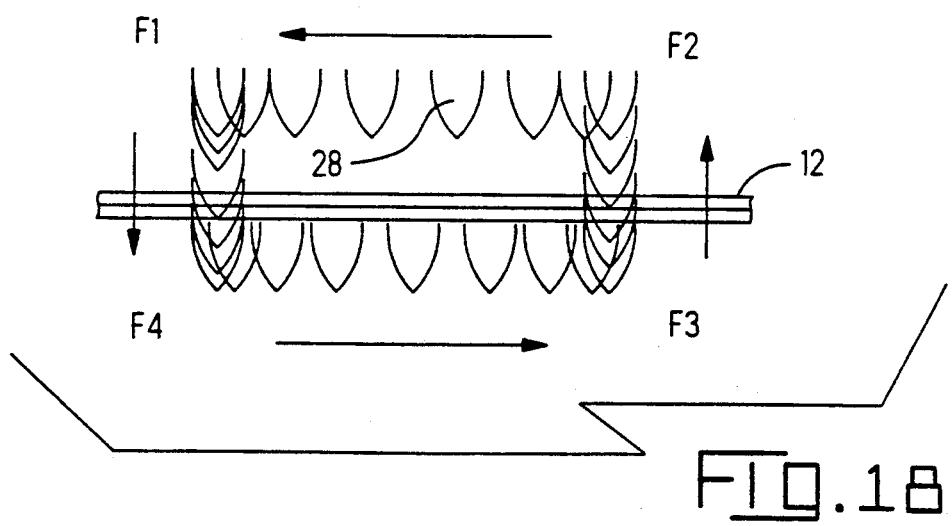
FIG. 18 is a diagram illustrating the motion of a feed finger of the feed assembly.

FIG. 18 shows the path of movement of a feed finger 28 of the feed member 26 between its F1 and F2, F2 and F3, F3 and F4 and its F4 and F1 positions.

Figure 19:
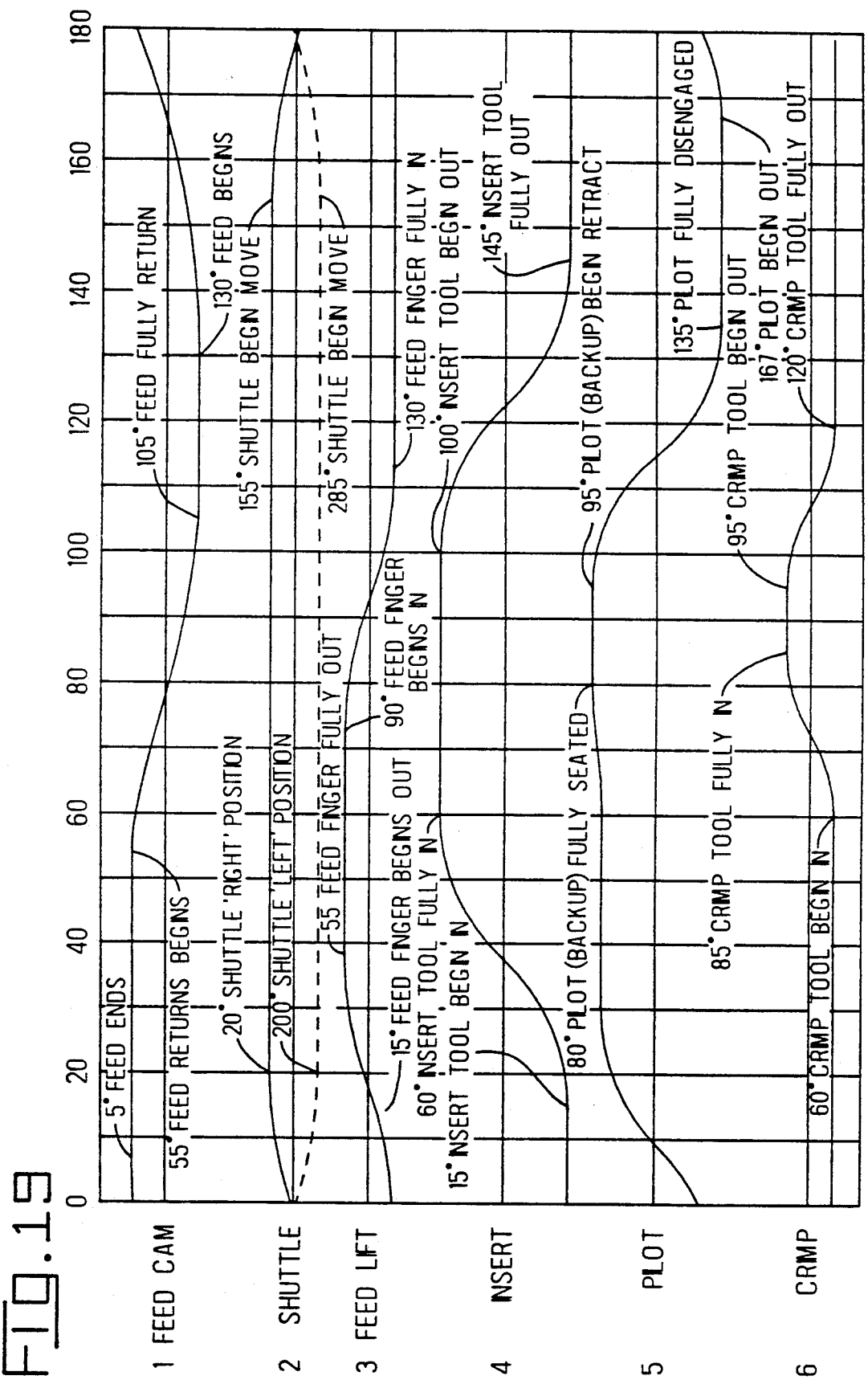
FIG. 19 is a timing diagram illustrating sequences of operation of moving parts of the machine.

FIG. 19 is a timing diagram which indicates the configuration of the cam tracks of the disk cam 50 in terms of the movements of the feed member 26, the shuttle 30, inserter 32, the back-up member 36, and the crimper 34.

The positions of these parts as designated with reference to FIG. 4, being shown in FIG. 19.

In FIG. 19, line 1 shows the horizontal movements of the feed member 26, line 2 shows the horizontal movements of the shuttle 30, line 3 shows the vertical movements of the feed member 26, line 4 shows the horizontal movements of the inserter 32, line 5 shows the vertical movements of the back-up member 36 and line 6 shows the vertical movements of the crimper 34. As indicated at the top of the diagram the movements all take place during 180 degrees of rotation of the disc cam 50. In line 2, the movement of the shuttle during the remaining 180 degrees is indicated in broken lines.

We claim:

1. A machine for assembling first work pieces to a strip form second work piece, the machine comprising:
   a frame;
   a disc cam mounted to the frame for rotation about its own axis and having a series of cam tracks extending thereabout;
   means for driving the disc cam in continuous rotation about said axis;
   work piece feed means mounted to the frame and being connected to a cam follower in a first of said cam tracks, for advancing said second work piece lengthwise thereof and axially of the disc cam towards a work piece assembly station along a work piece feed path, by one step during each half revolution of the disc cam;
   a work piece carrier shuttle mounted to the frame and having a plurality of work piece receptacles spaced lengthwise of said feed path each for releasably receiving a respective first work piece, said shuttle being connected to a cam follower in a second of said cam tracks for movement lengthwise of the feed path to position a respective work piece receptacle at said assembly station during each half revolution of the disc cam; and
   work piece assembly means mounted to the frame and connected to a cam follower in a third of said cam tracks, for reciprocating movement transversely of said feed path and towards and away from said shuttle and said assembly station to assemble a first work piece in said respective work piece receptacle to said second work piece during each half revolution of the disc cam.

2. A machine as claimed in claim 1, wherein said work piece receptacles are two in number, said third cam track being configured to move said shuttle between a first and second end position during each revolution of the disc cam, and the machine comprising means for loading a first work piece into a respective one of said receptacles in each end position of the shuttle.

3. A machine as claimed in claim 2, wherein said loading means comprises a vibratory feed bowl mounted to the frame above the shuttle and first and second work piece conduits connected to said bowl, each having an outlet opening towards the shuttle, the outlet of the first work piece conduit being positioned to load the first work piece into one of said receptacles in one end position of the shuttle and the outlet of the second conduit being positioned to load a first work piece into the other receptacle of the shuttle in the opposite end position thereof.

4. A machine as claimed in claim 1, comprising first and second work piece securing members mounted to the frame and being connected to respective fourth and fifth cam followers in respective fourth and fifth ones of said cam tracks, for movement in opposite senses towards and away from said assembly station for securing each first work piece to said second work piece.

5. A machine as claimed in claim 4, wherein the disc cam has first and second opposite cam plates, said first and second cam tracks being provided in a first cam plate and the third, fourth and fifth cam tracks being provided in the second cam plate.

6. A machine as claimed in claim 4, wherein the disc cam has first and second opposite cam plates, said first, second and third cam tracks being provided in a first cam plate and the fourth and fifth cam tracks being provided in the second cam plate.

7. A machine as claimed in claim 1, wherein the frame comprises a pair of juxtaposed frame plates cooperating to enclose the disc cam and internal peripheral bearings on which the disc cam is rotatable about said axis thereof, the disc cam comprising peripheral teeth and said drive means comprising a gear wheel meshing with said teeth and a motor drivingly connected to the gear wheel.

8. A machine as claimed in claim 1, wherein said assembly means comprises a slide which is slidably mounted on the frame for movement radially of the disc cam and which carries an assembly tool for removing a first work piece from each of said receptacles and assembling it to a second work piece, the shuttle being connected to the cam follower thereof by way of a first rocker mounted to the frame and the feed means being connected to the cam follower thereof by way of a second rocker mounted to the frame.

9. A machine as claimed in claim 4, wherein the frame comprises a pair of juxtaposed frame plates cooperating to enclose the disc cam, each work piece securing member comprising a slide mounted to one of the frame plates for movement radially of the disc cam, the cam follower of each slide extending through a radial slot in said one frame plate.

10. A machine for assembling components to electrical terminals connected together in side-by-side spaced relationship by means of a carrier strip, the machine comprising:
    a frame;
    a disc cam mounted to the frame for rotation about its own axis and having a series of endless cam tracks extending thereabout;
    means for driving the disc cam in continuous rotation about said axis;
    a strip feed mechanism mounted to the frame and being connected to a cam follower in a first of the cam tracks, for advancing said strip lengthwise thereof and axially of the disc cam, along a strip feed path towards an assembly station; by a distance amounting to the pitch of the terminals on the carrier strip, during each half revolution of the disc cam;
    a component carrier shuttle mounted to the frame and having a pair of component receptacles spaced lengthwise of said feed path, each for releasably receiving a respective one of said components, the said shuttle being connected to a cam follower in a second of said cam tracks, for reciprocating movement between a retracted first position and an advanced second position, lengthwise of said feed path, to position each receptacle at said assembly station, during each revolution of the cam disc;
    means for feeding a component to be assembled into one of said receptacles in each position of said shuttle;

a component assembly slide mounted to the frame and connected to a cam follower in a third of said cam tracks, for reciprocating movement transversely of said feed path and towards and away from said shuttle and said assembly station, in each position of the shuttle, to assemble a component in each receptacle to a respective terminal at the assembly station, during each revolution of the disc cam.

11. A machine as claimed in claim 10, further comprising a pair of tools mounted to the frame and being connected to respective cam followers in respective fourth and fifth ones of said cam tracks, for movement in opposite senses towards and away from said assembly station, for securing each component assembled to a terminal by said assembly slide, to that terminal.

12. A machine as claimed in claim 10, wherein said strip feed mechanism comprises a strip feed slide having at least one feed finger for engaging in a pilot hole in the carrier strip, the strip feed slide being connected to a cam follower in a sixth cam track of the disc cam, for displacing said feed finger from said pilot hole when the feed slide has advanced the strip, the first cam track being configured then to retract the feed slide and the sixth cam track being configured then to displace the feed slide to engage said feed finger in a further pilot hole in the carrier strip.

13. A machine as claimed in claim 12, wherein three of said cam tracks are formed in one face of said cam disc, the remaining cam tracks being formed in an opposite face thereof.

14. A machine as claimed in claim 11, comprising a feed track defining said feed path, for supporting said terminals and said carrier strip, said feed track having a notch therein at said assembly station providing access to a terminal thereat, for said assembly slide and said securing tools.

15. A machine as claimed in claim 11, wherein each tool of said pair is connected to said cam follower by way of a slide which is movable in the frame radially of the disc cam, the component assembly slide being mounted to the frame for movement radially of the disc cam, said slides being angularly spaced from one another by 90° being mounted to a common side plate of the frame.

16. A machine as claimed in claim 12, wherein said strip feed mechanism is connected to the cam follower in said first cam track by way of a second slide, the component carrier shuttle being connected to the cam follower in said second cam track by way of a third slide, said slides being mounted to a common side plate of the frame and being movable radially of the disc cam and being spaced from one another by 90°.

17. A machine as claimed in claim 11, wherein said components are ferrules, said receptacles being constituted by respective notches in said shuttle and said assembly slide having a tool configured to push each ferrule from its respective notch and to force it over a respective one of the terminals.

18. A machine as claimed in claim 16, comprising a pair of tools mounted to the frame and connected to respective cam followers in respective fourth and fifth ones of said cam tracks, for movement in opposite senses towards and away from said assembly station for securing each ferrule to a respective terminal to which it has been assembled, said tools comprising a crimping tool for crimping each ferrule to its respective terminal and a backup tool for supporting the terminal during the crimping operation and pilot pin for insertion into a pilot hole in the carrier strip to retain the terminal in position at the assembly station.

* * * * *